(12) United States Patent
Richman et al.

(10) Patent No.: US 11,294,459 B1
(45) Date of Patent: Apr. 5, 2022

(54) DYNAMIC ENHANCED SECURITY BASED ON EYE MOVEMENT TRACKING

(71) Applicant: Bank of America Corporation, Charlotte, NC (US)

(72) Inventors: Adam B. Richman, Charlotte, NC (US); Regina Peyfuss, Denver, CO (US); Andrew Paul Montgomery, London (GB); David Mortman, Worthington, OH (US)

(73) Assignee: Bank of America Corporation, Charlotte, NC (US)

(*) Notice: Subject to any disclaimer, the term of this patent is extended or adjusted under 35 U.S.C. 154(b) by 33 days.

(21) Appl. No.: 17/062,993

(22) Filed: Oct. 5, 2020

(51) Int. Cl.
*G06F 3/01* (2006.01)
*G06K 9/00* (2006.01)
*G06N 20/00* (2019.01)
*G06F 21/84* (2013.01)

(52) U.S. Cl.
CPC .............. *G06F 3/013* (2013.01); *G06F 21/84* (2013.01); *G06K 9/0061* (2013.01); *G06K 9/00617* (2013.01); *G06N 20/00* (2019.01)

(58) Field of Classification Search
CPC ....... G06F 3/013; G06F 21/84; G06K 9/0061; G06K 9/00617; G06N 20/00
See application file for complete search history.

(56) References Cited

U.S. PATENT DOCUMENTS

| | | |
|---|---|---|
| 9,124,685 B2 | 9/2015 | Kulas |
| 9,153,074 B2 | 10/2015 | Zhou et al. |
| 9,552,064 B2 | 1/2017 | He et al. |
| 10,043,033 B1* | 8/2018 | Hadsall .............. G06K 9/00087 |
| 10,048,749 B2 | 8/2018 | Miao et al. |
| 10,327,633 B2 | 6/2019 | Horesh et al. |
| 2013/0332160 A1 | 12/2013 | Posa |
| 2016/0283986 A1 | 9/2016 | Victor |
| 2018/0018514 A1* | 1/2018 | Azam ................ G06K 9/00335 |
| 2020/0193746 A1* | 6/2020 | Westmacott ............. G07C 9/38 |
| 2021/0279349 A1* | 9/2021 | Martino ................ G06N 20/00 |
| 2021/0334351 A1* | 10/2021 | Derakhshani ....... H04L 63/0861 |

OTHER PUBLICATIONS

Gazepoint, "Eye Tracking and Neuromarketing Research Made Easy", downloaded from <https://www.gazept.com/? clid=EAlalQobChMlurKcgrTt6gIVEb7ACh3q3AWXEAAYBCAAEgJ9QvD_BwE> on Oct. 2, 2020.

* cited by examiner

*Primary Examiner* — Abhishek Sarma
(74) *Attorney, Agent, or Firm* — Banner & Witcoff, Ltd.

(57) ABSTRACT

Systems for enhanced protection or security using eye movement tracking are provided. In some examples, a user may launch an application on a user device. If enhanced protections apply to the application, an image of a user eye may be captured and compared to pre-stored data to ensure the user is a registered user. Additional eye movement data may be captured and analyzed. Analyzing the eye movement data may include detecting a look-away by a user. If a look-away is detected, the application may be closed, data within the application may be obscured, or the like. Eye movement data may also be analyzed to identify portions of an application the user viewed for more than a threshold time period, less than a threshold time period, and the like. This data may be analyzed (e.g., using machine learning) to generate one or more heat maps.

21 Claims, 13 Drawing Sheets

DYNAMIC ENHANCED SECURITY BASED ON EYE MOVEMENT TRACKING

BACKGROUND

Aspects of the disclosure relate to systems and devices performing enhanced security based on eye movement tracking.

Privacy is a top concern for many people today. As people use their mobile devices more for processing transactions and other business, privacy and data security are becoming even more significant for users. Conventional systems may authenticate a user in order to permit access to an application. However, once the application is accessible, no further authentication or validation of the user may be conducted. This may enable unauthorized actors to view data on the device without permission.

Further, application use data is often relied on to evaluate application performance, user experience, and the like. However, conventional arrangements often rely on user selections via an application to evaluate application features. This might not provide sufficient detail for how a user is interacting with an application.

Accordingly, aspects described herein relate to tracking eye movement of a user while the user is interacting with an application to evaluate when a user is looking at an application and also to evaluate different features or portions of an application being viewed by a user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated protecting user privacy data and understanding user interactions with one or more applications executing on a user device.

In some examples, a user may launch an application on a user device, such as a mobile device. The application may be analyzed to determine whether enhanced protections apply to the application. If so, an image of a user eye may be captured and compared to pre-stored data to ensure the user is a registered user. If so, additional eye movement data may be captured and analyzed.

In some examples, analyzing the eye movement data may include detecting a look-away by a user. If a look-away is detected, the application may be closed, data within the application may be obscured, or the like. In some arrangements, when the user eye is again detected as viewing the application, the application may re-launch, overlays obscuring data may be removed, or the like.

Additionally or alternatively, eye movement data may be analyzed to identify portions of an application the user viewed for more than a threshold time period, less than a threshold time period, and the like. This data may be analyzed (e.g., using machine learning) to generate one or more heat maps that may be used to modify application design, improve user experience, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, maintaining user data privacy and security is a top priority for both users and enterprise organizations. As users rely more heavily on their person devices to conduct transactions, maintaining data privacy and security become even more critical. In addition, evaluating user experience with an application is also important to ensure positive customer experience.

Accordingly, as discussed herein, eye movement tracking may be used to aid in maintaining data privacy and security and in improving understanding of how users interact with applications in order to improve a user experience. As discussed, a user may register for enhanced protections. The enhanced protections may apply to all applications on a user device, or a portion thereof. In some examples, a user may identify particular application to apply enhanced protection. Additionally or alternatively, one or more categories or types of applications may receive enhanced protection.

Upon executing an application, if the application has enhanced protection, an image of a user of the application may be captured (e.g., by an image capture device of the user device). The image may be compared to pre-stored image data of the user to ensure the user is a registered user. If so, eye movement data may be captured (e.g., by the image capture device) and analyzed. Analyzing the eye movement data may include identifying a look-away by the user. If a look-away is detected, access to the application may be modified. For instance, the application may automatically close, the applications or portions thereof may be obscured, and the like. If the registered user eye is detected again, access to the application may again be modified in order to enable the user to access the application.

Additionally or alternatively, the eye movement data may be analyzed to understand user interactions with an application. In some examples, machine learning may be used to detect patterns in eye movement related to a particular application. This data may be used to generate one or more heat maps that may be used to identify improvements to applications, user experience with the application, and the like.

These and various other arrangements will be discussed more fully below.

Figure 1A:
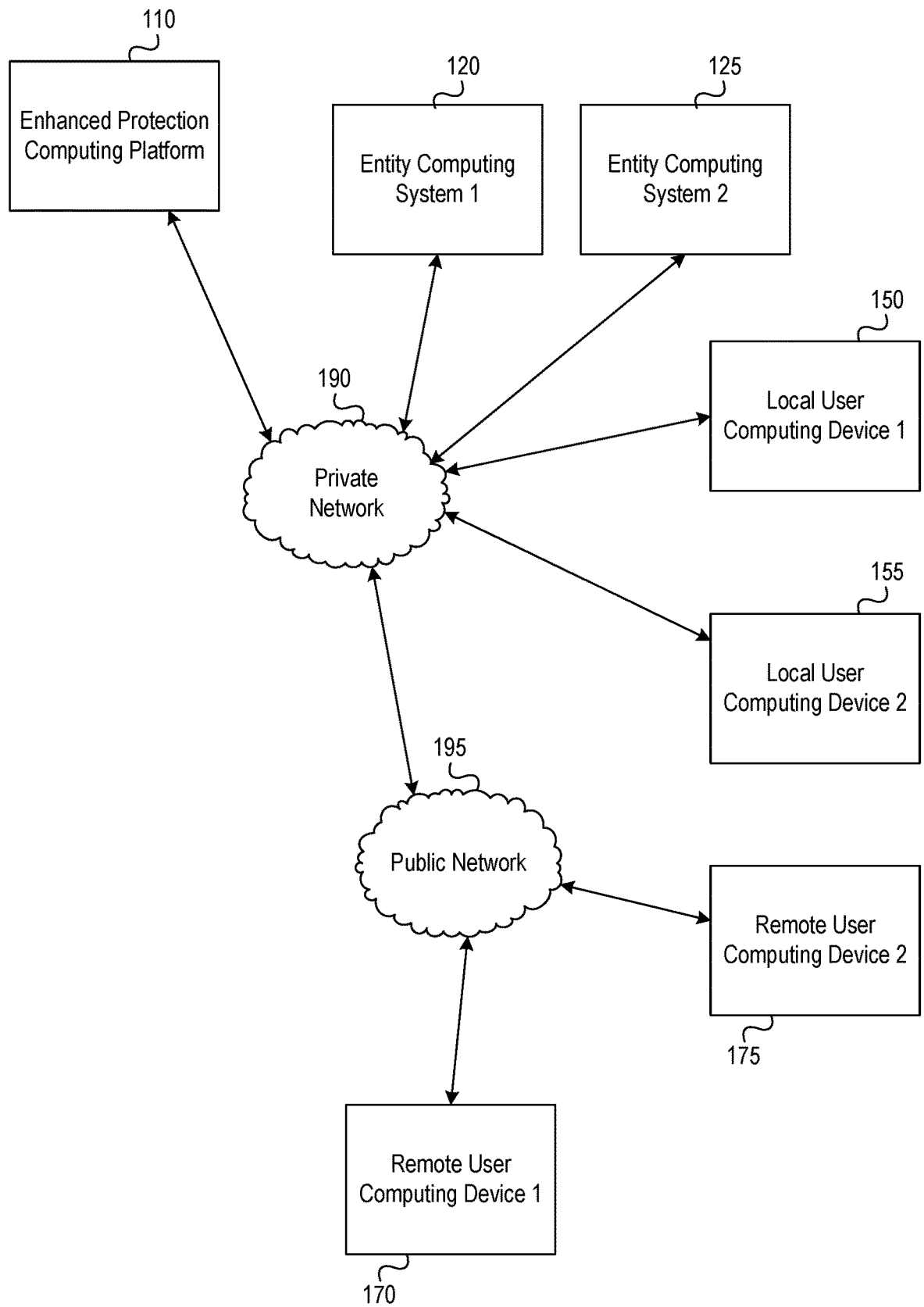
FIGS. 1A and 1B depict an illustrative computing environment for implementing enhanced security or protection functions in accordance with one or more aspects described herein.
Figure 1B:
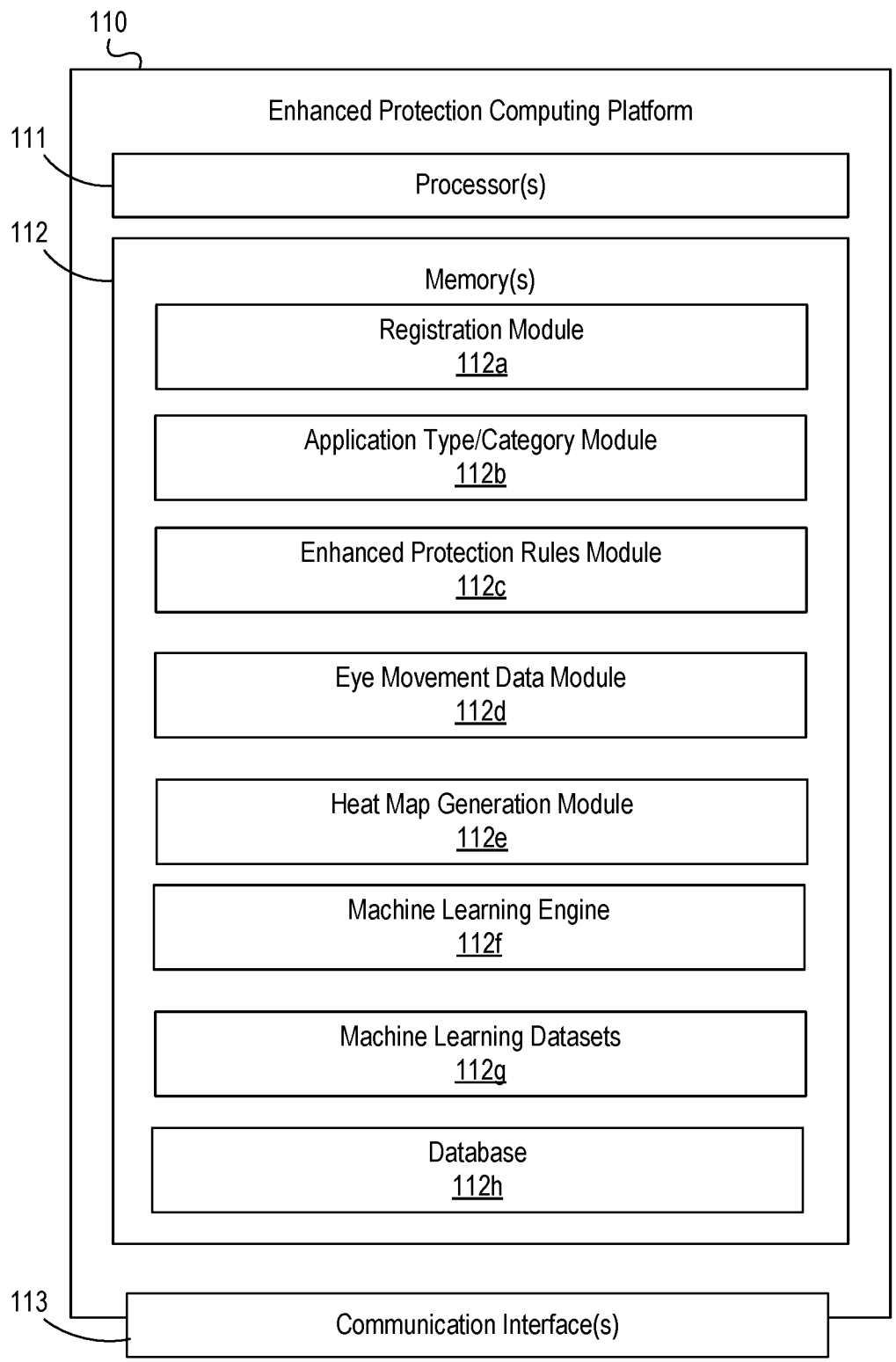

FIGS. 1A-1B depict an illustrative computing environment for implementing and using a system for dynamic enhanced protection based on eye movement tracking in accordance with one or more aspects described herein. Referring to FIG. 1A, computing environment 100 may include one or more computing devices and/or other computing systems. For example, computing environment 100 may include enhanced protection computing platform 110, entity computing system 1 120, entity computing system 2 125, a first local user computing device 150, a second local user computing device 155, a first remote user computing device 170, and a second remote user computing device 175. Although two entity computing systems 120, 125, two local user computing devices 150, 155, and two remote user computing device 170, 175 are shown, more or fewer devices may be used without departing from the invention.

Enhanced protection computing platform 110 may be configured to provide intelligent, dynamic, enhanced protection functions based on, for example, eye movement tracking. For instance, aspects described herein may be implemented via a user computing device, such as a smartphone, laptop, or other mobile device (e.g., remote user computing device 170, remote user computing device 175, or the like). In some examples, a user may select enhanced protections such as by registering his or her device with enhanced protection computing platform 110. In some examples, a user may select an application or type or category of application for enhanced protection. For instance, users may desire to have enhanced protection for some applications executing on the mobile device (e.g., mobile banking applications) but not others (e.g., weather applications). Additionally or alternatively, the enhanced protection computing platform 110 may identify and to determine one or more applications or types of applications to which to apply enhanced protections.

Based on user registration, one or more enhanced protection rules or instructions may be generated by the enhanced protection computing platform 110 and transmitted to the user device (e.g., remote user computing device 170, remote user computing device 175) for execution. Accordingly, as a user interacts with her or her device, eye movement of the user may be captured and tracked. For instance, upon executing an application associated with enhanced protection, one or more enhanced protection rules or instructions may be executed to activate, for instance, a forward facing camera of the user device. The camera may capture image data of one or more eyes of a user. This image data may be compared to pre-stored image data associated with a registered eye to confirm that the user eye is a registered eye. If not, the system may prevent access to the application. If so, the user may be permitted to access the application.

Further, as the user interacts with the application, eye movement data may be captured and transmitted to enhanced protection computing platform 110 for further analysis. For instance, eye movement corresponding to different features of the application may be captured and used to identify features of interest to the user. This data may be used to provide enhanced user experience via the application. Additionally or alternatively, the eye movement data may be aggregated with data of other users to improve customer interaction with the application.

In some examples, eye movement of the user for applications having enhanced protection may be tracked during use of the application. A departure of one or more eyes detected (e.g., for a predetermined period of time) may cause the device to obscure the user interface associated with the application (e.g., temporarily) to ensure other, non-registered users are not able to view data on the user interface.

Entity computing system 1 120 and entity computing system 2 125 may be computing devices associated with the entity or enterprise organization implementing the enhanced protection computing platform 110. One or more of entity computing system 1 120, entity computing system 2 125, or the like, may be or include one or more computing devices, servers, systems, or the like, associated with or internal to the entity implementing the enhanced protection functionality and may host one or more applications executing on the user device, such as a mobile banking application, online banking application, or the like. Additionally or alternatively, entity computing system 1 120 and/or entity computing system 2 125 may store data associated with a plurality of users, such as account data, contact information data, and the like, that may be accessed by the user via the application executing on the mobile device.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the enhanced protection computing platform 110, entity computing system 1 120, entity computing system 2 125, or the like to control parameters associated with the devices or systems, update or execute rules, modify settings and the like.

The remote user computing device 170 and remote user computing device 175 may be used to communicate with, for example, one or more systems, computing platforms, devices, or the like, to execute rules for enhanced protection, detect and authenticate an eye of a user, capture eye movement, and the like. As discussed herein, remote user computing device 170, remote user computing device 175, or the like, may be a user computing device, such as a mobile device. For instance, remote user computing device 170 and/or remote user computing device 175 may be a smartphone, wearable device, tablet computer, or the like, having an image capture device associated therein (e.g., either integrated into the device or in communication with the device).

Computing environment 100 also may include one or more computing platforms. For example, and as noted above, computing environment 100 may include enhanced protection computing platform 110. As illustrated in greater detail below, enhanced protection computing platform 110 may include one or more computing devices configured to perform one or more of the functions described herein. For example, enhanced protection computing platform 110 may include one or more computers (e.g., laptop computers, desktop computers, servers, server blades, or the like).

As mentioned above, computing environment 100 also may include one or more networks, which may interconnect one or more of enhanced protection computing platform 110, entity computing system 1 120, entity computing system 2 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, enhanced protection computing platform 110, entity computing system 1 120, entity computing system 2 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect enhanced protection computing platform 110, entity computing system 1 120, entity computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., enhanced protection computing platform 110, entity computing system 1 120, entity computing system 2 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., enhanced protection computing platform 110, entity computing system 1 120, entity computing system 2 125, local user computing device 150, local user computing device 155).

Referring to FIG. 1B, enhanced protection computing platform 110 may include one or more processors 111, memory 112, and communication interface 113. A data bus may interconnect processor(s) 111, memory 112, and communication interface 113. Communication interface 113 may be a network interface configured to support communication between enhanced protection computing platform 110 and one or more networks (e.g., private network 190, public network 195, or the like). Memory 112 may include one or more program modules having instructions that when executed by processor(s) 111 cause enhanced protection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of enhanced protection computing platform 110 and/or by different computing devices that may form and/or otherwise make up enhanced protection computing platform 110.

For example, memory 112 may have, store and/or include a registration module 112a. Registration module 112a may store instructions and/or data that may cause or enable the enhanced protection computing platform 110 to receive data related to one or more users, user devices, and the like. In some examples, registration module 112a may receive other registration data such as user options to enable enhanced protection (e.g., particular applications to provide enhanced protections, type or category of application, or the like). In some arrangements, authentication data (e.g., eye image data, biometric data, device data, username and password data, PIN, or the like) may be provided via the registration module 112a and pre-stored for later comparison to received authentication data (e.g., subsequently captured eye image data). The registration module 112a may, upon receiving registration data, modify a database to store the registration data in a new entry. In some examples, registration module 112a may, with permission of the user, retrieve data related to the user and/or user device from one or more other entity devices or systems (e.g., pre-stored account data, authentication data, or the like), such as entity computing system 1 120, entity computing system 2 125, or the like.

Enhanced protection computing platform 110 may further have, store and/or include application type/category module 112b. For instance, after registering a user device, application data associated with one or more applications executing on the user device may be received by the enhanced protection computing platform 110 and analyzed to identify one or more applications for enhanced protections. For instance, each application may be evaluated to identify a type of application or category associated therewith. In some examples, the evaluation may be binary (e.g., type or category having enhanced protection vs. type of category not having enhanced protection). Accordingly, each application may be categorized into one of the two options.

Additionally or alternatively, each application may be fitted into 3 or more categories or types. In some examples, applications in a first category may have full enhanced protection, applications in a second category may have some enhanced protections (e.g., fewer than full protection provided to the first category of applications), and applications in a third category may have no enhanced protections. Although two and three categories are provided as examples, more categories or types may be used without departing from the invention.

Enhanced protection computing platform 110 may further have, store and/or include enhanced protection rules module 112c. Enhanced protection rules module 112c may store instructions and/or data that may cause or enable the enhanced protection computing platform 110 to generate one or more rules for executing enhanced protection, capturing eye movement data, determining a registered eye, and the like. In some examples, the rules may be generated based on user preferences (e.g., received during a registration process) and/or based on categories or types of applications determined or identified by the application type/category module 112b. In some examples, the rules may be transmitted to a user device (e.g., remote user computing device 170, remote user computing device 175, or the like) and executed. In some examples, one or more rules may be executed upon detecting that an application has launched or is currently executing. In some arrangements, one or more rules may be executed upon transfer to the user device.

Enhanced protection computing platform 110 may further have, store and/or include eye movement data module 112d. Eye movement data module 112d may store instructions and/or data that may cause or enable the enhanced protection computing platform 110 to receive eye movement data captured by an image capture device of a user device, such as remote user computing device 170, remote user computing device 175, or the like. The eye movement data may correspond to movement of a user's eye or eyes (in some examples, a registered user) during use of a particular application or application in a particular category or of a particular type (e.g., identified for enhanced protection). In some arrangements, all eye movement during execution of the application may be captured and analyzed by the eye movement data module 112d. For instance, the movement of the eye or eyes, time spent in one particular position, how quickly the eye or eyes move over an area of the user interface, and the like, may be identified or determined from the captured eye movement data. This data may then be accessed by the heat map generation module 112e.

Additionally or alternatively, eye movement data module 112d may, in some examples, receive data in real-time to determine whether a user has looked away from an application executing enhanced protections for at least a predetermined time period. If so, an instruction to execute a rule by the user device to prevent access to the application, obscure the image of the application or user interface, or the like, may be generated and transmitted to the user device.

Heat map generation module 112e may store instructions and/or data that may cause or enable the enhanced protection computing platform 110 to analyze eye movement data, along with user interface data associated with one or more applications, to identify functions or regions of the user interface a user spent more than a predetermined amount of time viewing, functions or regions of the user interface the user spent less than a predetermined amount of time viewing, selections made, areas not viewed, or the like. This data may be used to generate one or more heat maps indicating areas, features, functions, or the like, of an application or user interface within an application that users viewed more than others, users viewed less than others, and the like. This information may be used to identify areas or features of an application a user may find helpful, modify arrangement of user interfaces or features on a user interface in an application, identify improvements to customer service or a user experience, or the like. The one or more heat maps may be transmitted to, for instance, local user computing device 150, local user computing device 155, or other internal entity computing device to aid in resource allocation, application design, and the like.

In some examples, machine learning may be used to recognize patterns in user eye movement, predict useful features within an application, identify alternate arrangements of features in an application, and the like, based on the received eye movement data. Accordingly, enhanced protection computing platform 110 may further have, store and/or include a machine learning engine 112f and machine learning datasets 112g. Machine learning engine 112f and machine learning datasets 112g may store instructions and/or data that cause or enable enhanced protection computing platform 110 to analyze eye movement data, application data, and the like, to generate or execute one or more machine learning datasets to identify patterns in data, generate predictions associated with applications, and the like. The machine learning datasets 112g may be generated based on analyzed data (e.g., data from previously received data, and the like), raw data, and/or received from one or more outside sources.

The machine learning engine 112f may receive data and, using one or more machine learning algorithms, may generate one or more machine learning datasets 112g. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112f may analyze data to identify patterns of activity, sequences of activity, and the like, to generate one or more machine learning datasets 112g.

The machine learning datasets 112g may include machine learning data linking one or more eye positions, length of time for a particular eye position, feature of a user interface, region of a user interface, or the like, to a particular output (e.g., a user has skipped over a feature or region, a user has spent an extended time viewing a region, or the like). Accordingly, these outputs may be used to predict features desirable to users, generate recommended positions for particular features within a user interface, or the like.

Various other examples of generating machine learning datasets and linking data from historical requests for access, and the like, may be used without departing from the invention.

The machine learning datasets 112g may be updated and/or validated based on subsequent data received, for example, after first eye movement data is received, subsequent eye movement data and/or application data may be used to validate or update one or more machine learning datasets 112g.

Enhanced protection computing platform 110 may further have, store and/or include one or more databases 112h. Database 112h may store data related to user applications, previously captured eye movement data, and the like.

FIGS. 2A-2F depict one example illustrative event sequence for implementing and using enhanced protection functions in accordance with one or more aspects described herein. The events shown in the illustrative event sequence are merely one example sequence and additional events may be added, or events may be omitted, without departing from the invention.

At step 201, a request to register may be received by a user device, such as remote user computing device 170. For instance, user input requesting registration of the user, device, or the like, may be received by the remote user computing device 170 (e.g., via keypad, touch screen, or the like). In some examples, the request to register may include registration data. For instance, user information such as name, contact information, account information, and the like, may be provided. Additionally or alternatively, user device data may be received. For instance, a unique identifier associated with remote user computing device 170, phone number associated with remote user computing device 170, or the like, may be received. In some examples, the registration data may further include an image of one or more eyes of the user or users requesting registration. For instance, a user may scan an eye using one or more sensors on the remote user computing device, may capture an image of an eye or eye using an image capture device of the remote user computing device 170, or the like. This data may be used to verify that a user interacting with the remote user computing device 170 is a registered user.

At step 202, a connection may be established between the remote user computing device 170 and the enhanced protection computing platform 110. For instance, a first wireless connection may be established between the enhanced protection computing platform 110 and remote user computing device 170. Upon establishing the first wireless connection, a communication session may be initiated between enhanced protection computing platform 110 and remote user computing device 170.

At step 203, the request to register and registration data may be transmitted from the remote user computing device 170 to the enhanced protection computing platform 110. For instance, the request to register and registration data may be transmitted during the communication session initiated upon establishing the first wireless connection.

At step 204, the request to register and registration data may be received by the enhanced protection computing platform 110. At step 205, responsive to receiving the request to register and registration data, a registration entry may be generated. For instance, a database may be modified to include an entry associated with the registration request. The entry may include a plurality of data elements associated with the user, remote user computing device 170, and the like. In some examples, the database entry may include account or other data associated with the user and retrieved from one or more entity systems, such as entity computing system 1 120.

Figure 2A:
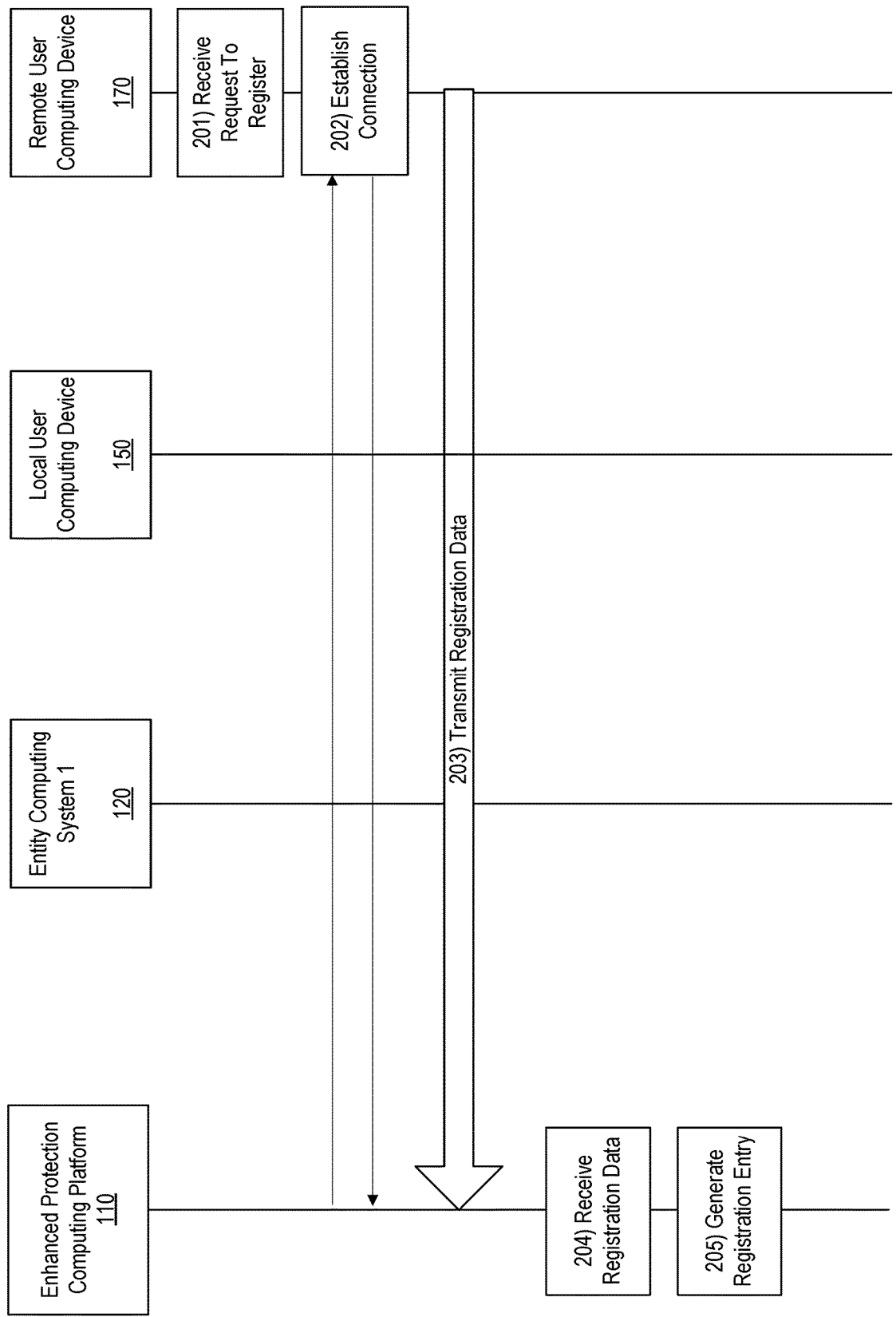
FIGS. 2A-2F depict an illustrative event sequence for implementing enhanced security or protection functions in accordance with one or more aspects described herein.
Figure 2B:
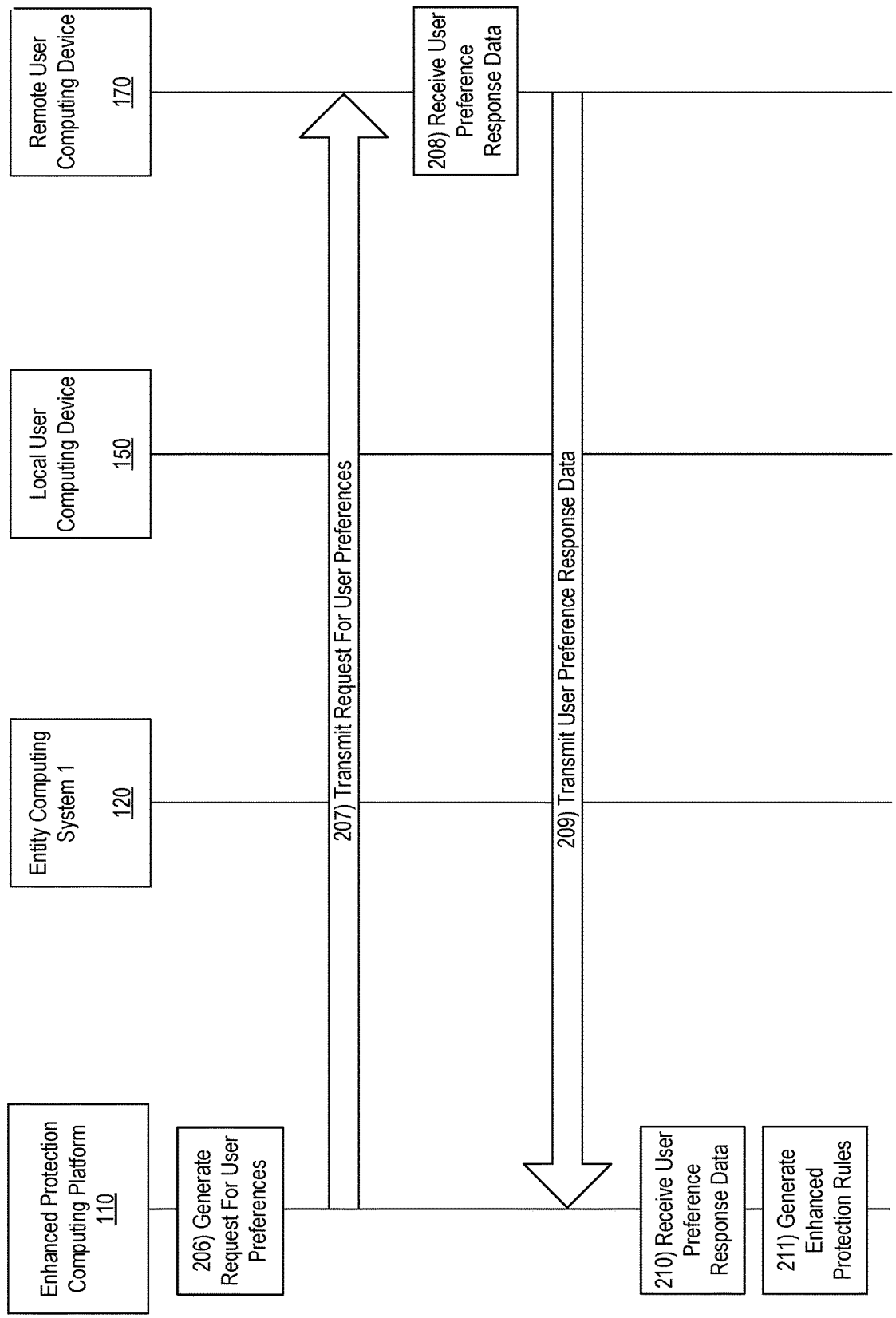

With reference to FIG. 2B, at step 206, a request for user preferences may be generated by the enhanced protection computing platform 110. For instance, a request for user preferences related to when to activate enhanced protection, types or categories or names of applications to which to apply enhanced protection, and the like, may be generated.

At step 207, the request for user preferences may be transmitted from the enhanced protection computing platform 110 to the remote user computing device 170. For instance, the request for user preferences may be transmitted during the communication session initiated upon establishing the first wireless connection. Alternatively, another wireless connection may be established and communication session initiated.

At step 208, the request may be received and user preference response data may be received by the remote user computing device 170. For instance, a response to the request for user preferences may be received by the remote user computing device 170 and user preference response data may be generated based on the user input.

At step 209, the user preference response data may be transmitted from the remote user computing device 170 to the enhanced protection computing platform 110. For instance, the user preference response data may be transmitted during the communication session initiated upon establishing the first wireless connection. Alternatively, another wireless connection may be established and communication session initiated.

At step 210, the user preference response data may be received by the enhanced protection computing platform 110. At step 211, based on the received user preferences and/or other enhanced protection application profiles and the like, one or more enhanced protection rules may be generated. In some examples, machine learning may be used to generate the one or more enhanced protection rules. Enhanced protection rules may include rules controlling when enhanced protection is activated (e.g., a user may select to activate when connected to public WiFi but not when connected to home WiFi), applications for which enhanced protection should be activated, types or categories of applications for which enhanced protection should be activated, and the like.

In some examples, the user preference data may include data associated with applications executing on, downloaded to, or otherwise maintained on the remote user computing device 170. In some arrangements, generating the one or more enhanced protection rules may include identifying a type of application or category associated with each application on the remote user computing device 170 and storing that information for use in generating rules to activate enhanced protection.

Figure 2C:
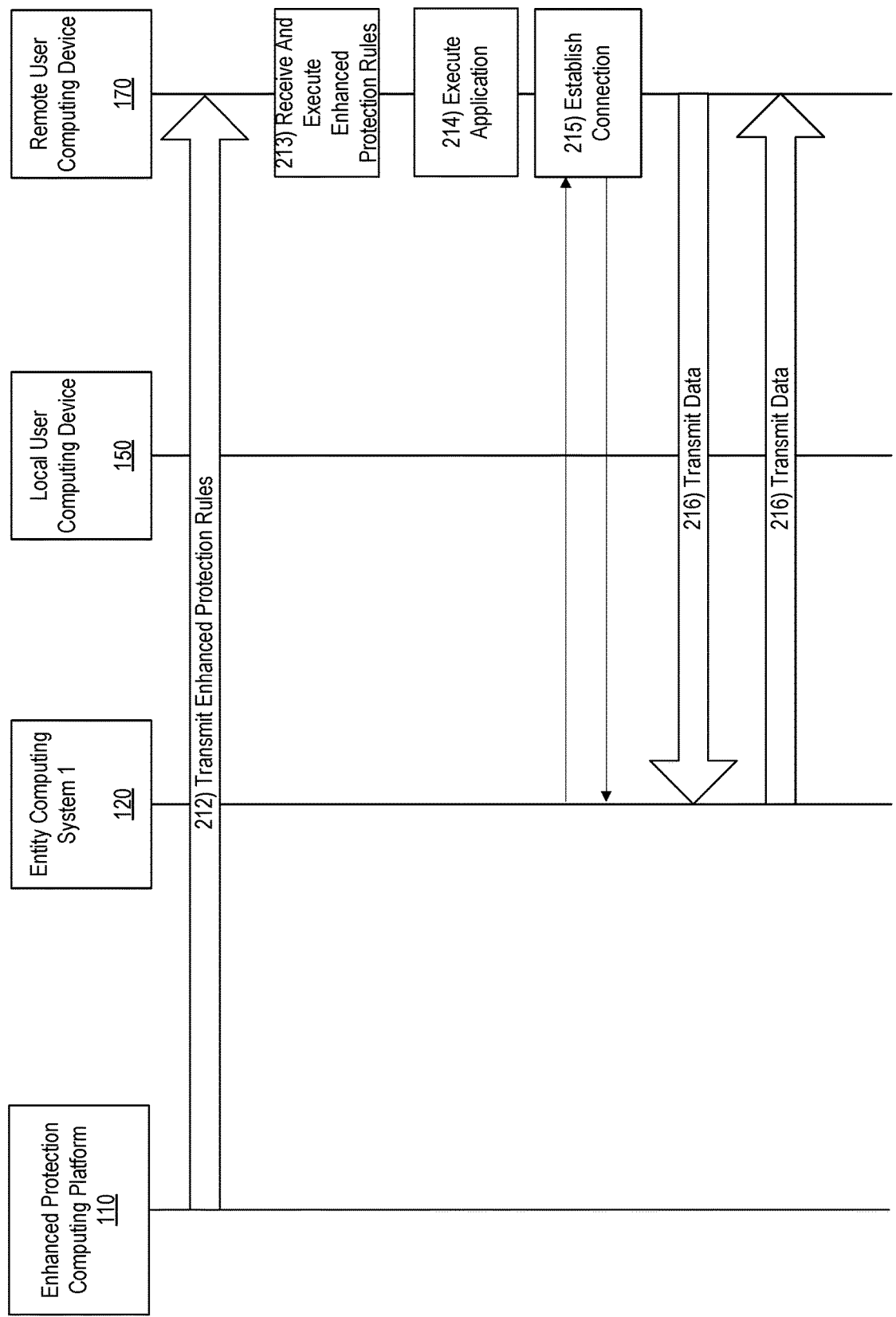

With reference to FIG. 2C, at step 212, the enhanced protection rules may be transmitted from the enhanced protection computing platform 110 to the remote user computing device 170. In some examples, the enhanced protection rules may be transmitted during the communication session initiated upon establishing the first wireless connection. In other examples, if a new wireless connection may be established and communication session initiated.

At step 213, the enhanced protection rules may be received by the remote user computing device 170 and executed by the remote user computing device 170. In some examples, one or more rules may be executed upon being received by the remote user computing device 170. Additionally or alternatively, one or more rules may be stored by the remote user computing device 170 and executed upon detection of a triggering event (e.g., execution or launch of an application, or the like).

At step 214, an application may be executed or launched by the remote user computing device 170. For instance, an application downloaded or otherwise provided to the remote user computing device 170 may be executed.

At step 215, a connection may be established between the remote user computing device 170 and entity computing system 1 120. For instance, a second wireless connection may be established between the remote user computing device 170 and entity computing system 1 120. Upon establishing the second wireless connection, a communication session may be initiated between entity computing system 1 120 and remote user computing device 170.

At step 216, data may be transmitted between the remote user computing device 170 and the entity computing system 1 120. For instance, data associated with user accounts, and the like, may be transmitted and/or received by the remote user computing device and entity computing system 1 120 during the communication session initiated upon establishing the second wireless connection.

Figure 2D:
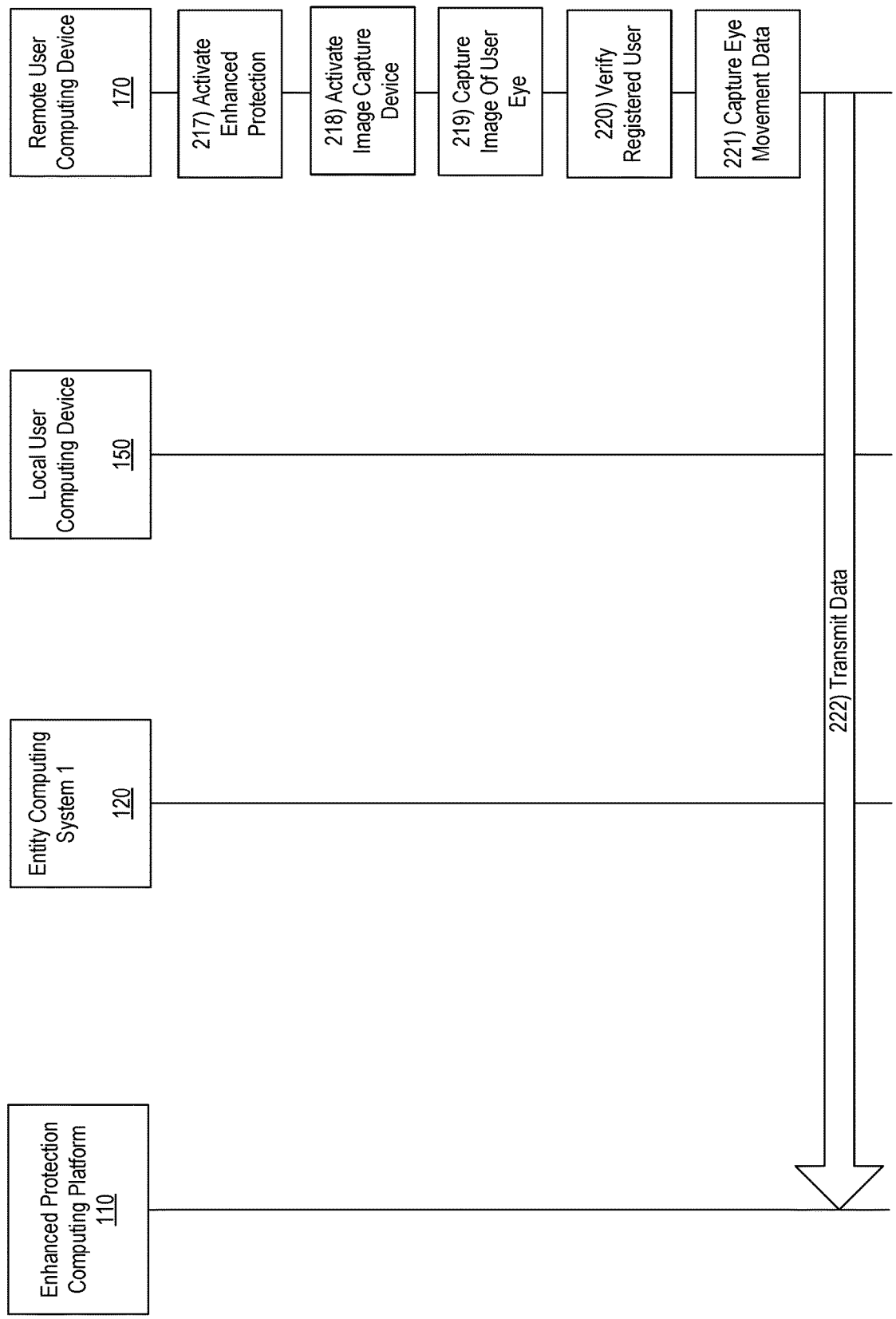

With reference to FIG. 2D, the application that executed may be evaluated to determine whether enhanced protection applies. If so, at step 217, enhanced protection may be activated and/or one or more enhanced protection rules may be executed. For instance, if the application or type of application that was executed is flagged for enhanced protection, one or more protections or rules (e.g., eye movement monitoring, eye verification, eye drift detection, or the like) may be activated or executed. In some examples, the enhanced protections may be activated for only the application that executed (e.g., at step 214). Additionally or alternatively, enhanced protections may be activated for other applications (e.g., all or some applications also executing on the device 170, or the like).

For instance, at step 218, based on enhanced protections being activated in step 217, an image capture device of the remote user computing device 170 may be activated. For instance, a forward facing camera of the image capture device may be activated or enabled.

At step 219, the forward facing camera may be used to capture an image of one or more eyes of the user. The image may, in some examples, be a still image. In other examples, the image may be video image or continuous image capture.

At step 220, the captured image of the user eye(s) may be compared to pre-stored image data to verify that the eye(s) corresponds to an eye of a registered user. For instance, captured image data of an eye may be compared to pre-stored image data captured upon registering the user (e.g., via the registration data). In some examples, the captured image may be compared to an image stored on the remote user computing device 170 to verify that the user is registered. Additionally or alternatively, the captured image data may be transmitted to the enhanced protection computing platform 110 for comparison to pre-stored eye image data received at registration. If the captured eye data matches the pre-stored data, the user may be validated as a registered user. If not, the system may flag the user as an unregistered user and may prevent access to the application, limit functionality of the application, obscure portions of the user interface, or the like.

At step 221, additional eye movement data of the user, e.g., upon validation as the registered user, may be captured. For instance, the forward facing camera of the remote user computing device 170 may capture one or more images, video, or the like of the eye movement of the user as the user interacts with the application. Movement of one or both eyes may be captured and, in some examples, the data may be captured continuously as the user interacts with the application for which enhanced protection is activated or enabled.

At step 222, the captured eye movement data may be transmitted from the remote user computing device 170 to the enhanced protection computing platform 110. In some examples, the captured eye movement data may be transmitted during the communication session initiated upon establishing the first wireless connection. Alternatively, another wireless connection may be established and communication session initiated. In some arrangements, the eye movement data may be transmitted for analysis in real-time or near real time. Alternatively, the data may be transmitted in batches at predetermined or periodic time intervals.

Figure 2E:
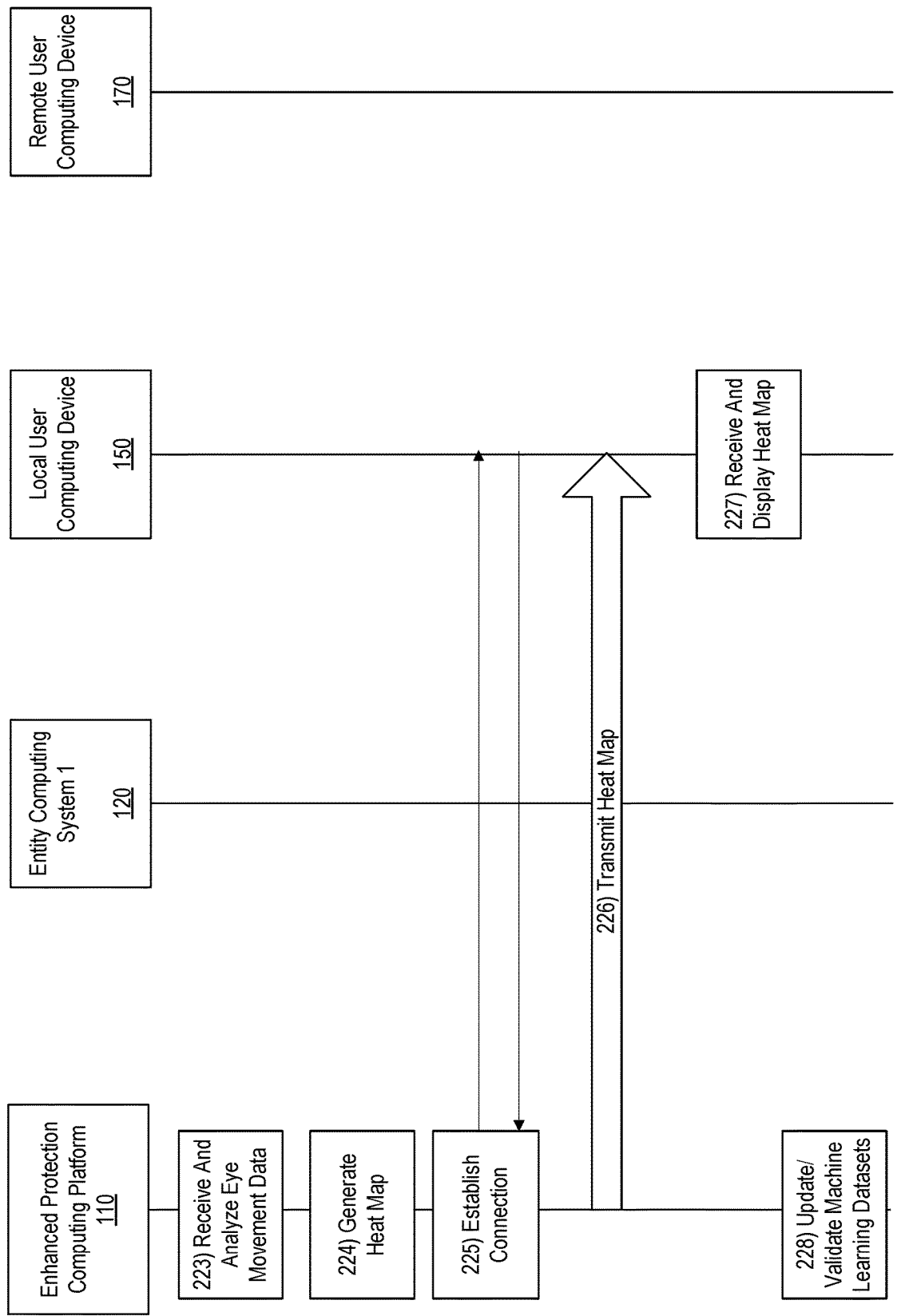

With reference to FIG. 2E, at step 223, the eye movement data may be received and analyzed. For instance, the eye movement data captured while the user interacts with the application, as well as application data (e.g., features, layout, and the like) may be analyzed to identify portions that a user viewed for at least a predetermined time period (e.g., 3 seconds, 5 seconds, 30 seconds, or the like), portions that the user viewed less than a predetermined time period (e.g., less than 1 second, less than 0.5 seconds, or the like), portions where a user zoomed, portions that were scrolled past, or the like. The eye movement data may be correlated to the application data and/or layout (in some examples, using machine learning) and, at step 224 one or more heat maps may be generated. The heat maps may identify regions that seemed particularly useful to a user based on eye movement, were not useful, or the like. In some examples, machine learning may be used to analyze the data and/or generate the heat maps. This information may then be used to modify application designs, improve user experience, and the like.

At step 225, a connection may be established between the enhanced protection computing platform 110 and local user computing device 150. For instance, a third wireless connection may be established between the enhanced protection computing platform 110 and local user computing device 150. Upon establishing the third wireless connection, a communication session may be initiated between enhanced protection computing platform 110 and local user computing device 150.

At step 226, the generated heat map may be transmitted from the enhanced protection computing platform 110 to the local user computing device 150. For instance, the heat map may be transmitted during the communication session initiated upon establishing the third wireless connection.

At step 227, the heat map may be received by local user computing device 150 and displayed. As indicated above, the heat map may be used to modify application designs, provide improved user experience, and the like. In some examples, machine learning may be used to generate recommendations for modifications to an application based on the generated heat maps.

At step 228, one or more machine learning datasets may be updated and/or validated based on the analyzed eye movement data, generated heat maps, and the like. Accordingly, the machine learning datasets used to analyze data, generate recommendations or outputs, and the like, may be continuously refined and improved.

Figure 2F:
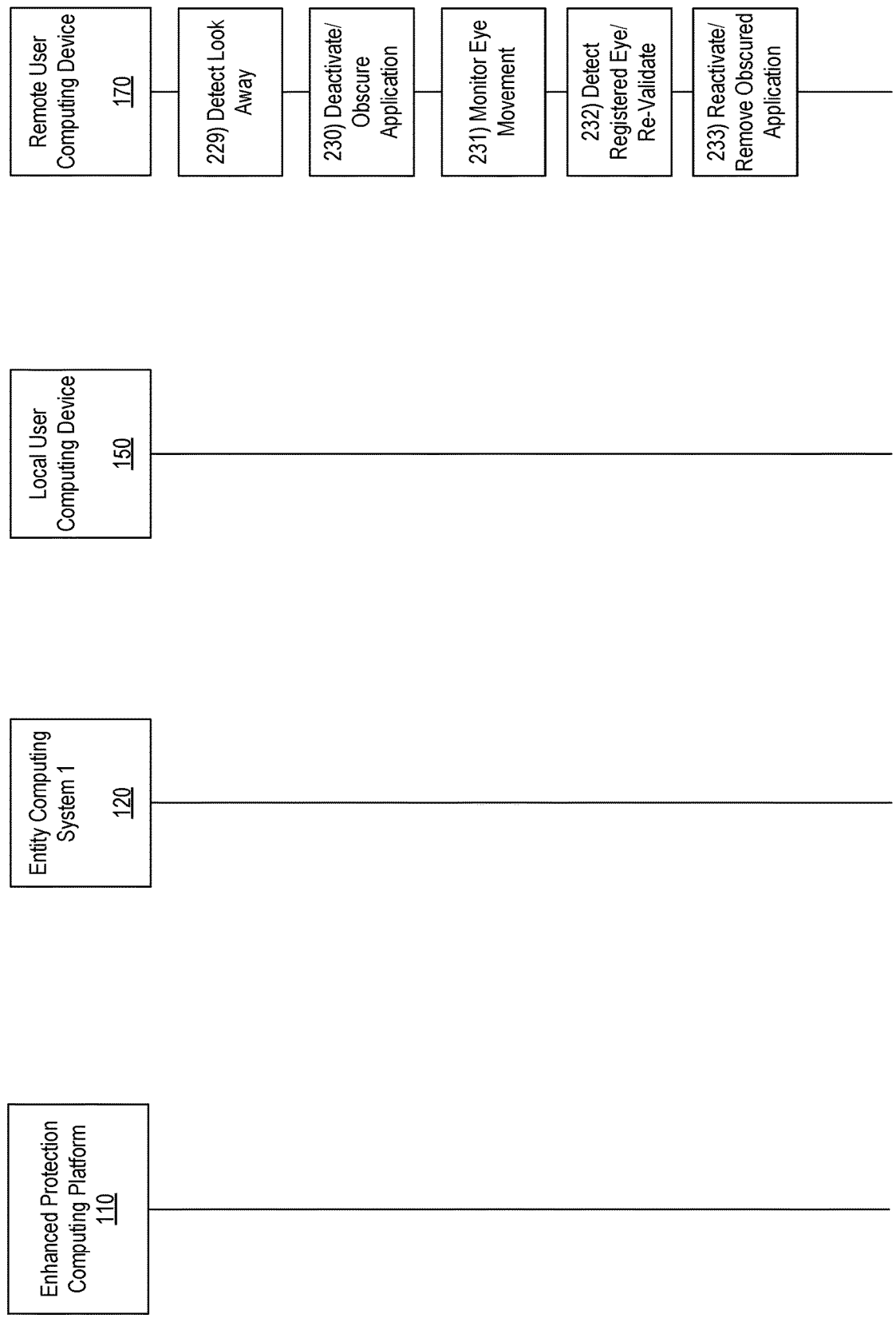

With reference to FIG. 2F, at step 229, the captured eye movement data may be analyzed (e.g., continuously) by, for instance, remote user computing device 170, to determine whether a user has "looked away" from the application. For instance, if a user eye is not detected for at least a predetermined time period (e.g., 3 seconds, 5 second, 10 seconds, or the like), the remote user computing device 170 may detect a look-away and may execute one or more enhanced protection rules. Additionally or alternatively, the captured eye movement data may be analyzed to detect an eye of an unregistered user. For instance, analyzing the eye movement data may include monitoring for an eye that does not match the eye of the registered user (e.g., a user looking over the shoulder of the registered user).

For instance, if the user eye is not detected for the predetermined time period, at step 230, the application may be closed, portions of the user interface associated with the application may be obscured, a neutral screen may appear overlaying the application to prevent access to data displayed in the application, or the like.

Additionally or alternatively, the captured eye movement data may be analyzed to detect an eye of an unregistered user. For instance, analyzing the eye movement data may include monitoring for an eye that does not match the eye of the registered user (e.g., a user looking over the shoulder of the registered user). If an unregistered eye is detected, access to the application may be modified similarly to a detection of a look-away by the user (e.g., close or prevent access to the application, obscure data, or the like).

Figure 3A:
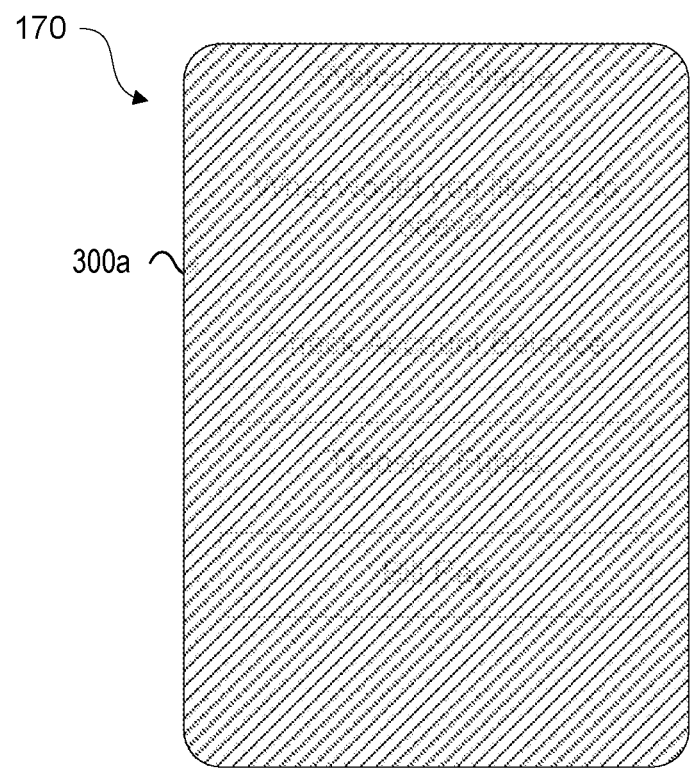
FIGS. 3A and 3B illustrate an example user device having obscured data and visible data in accordance with one or more aspects described herein.

FIG. 3A illustrates one example device 170 having an application obscured based on detection of a look-away and/or detection of a non-registered eye. As shown in FIG. 3A, data within the application is obscured by an overlay 300*a*. The example shown in FIG. 3A is for illustrative purposes. The level to which the data in the application is obscured may vary without departing from the invention. For instance, the screen may appear completely darkened in some examples. In other examples, only portions of the application may be obscured. In still other examples, the data may be obscured such that it is visible to a user but not unless viewed from a particular direction (e.g., the user is looking directly at the device). Various other examples may be used without departing from the invention.

Figure 3B:
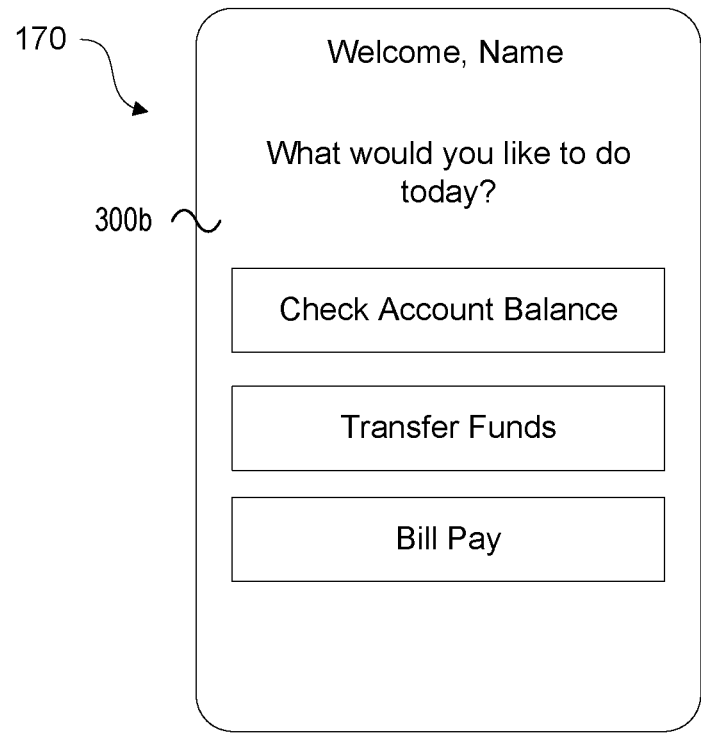

At step 231, the forward facing camera may continue to capture data to detect an eye again (e.g., detect a user attempting to resume interacting with the application in the case of a look-away) and/or no longer detect the non-registered eye. At step 232, a registered eye may be detected (e.g., after look-away) and/or a non-registered eye may no longer be detected. In some examples, if, after a look-away an eye is detected, the eye data may be validated to ensure the user is a registered user. At step 233, one or more enhanced protection rules to undo protections executed at step 230 (e.g., further modify access to the application) may be executed. For instance, the application may be executed (e.g., re-executed) or re-launched, a previous session may be reinstated, portions obscured may be visible again, the neutral screen overlay may be removed, or the like. For instance, as shown in FIG. 3B, the device 170 has a user interface 300*b* with data visible. The overlay 300*a* obscuring the data in FIG. 3A has been removed to enable a user to interact with the application again.

Figure 4:
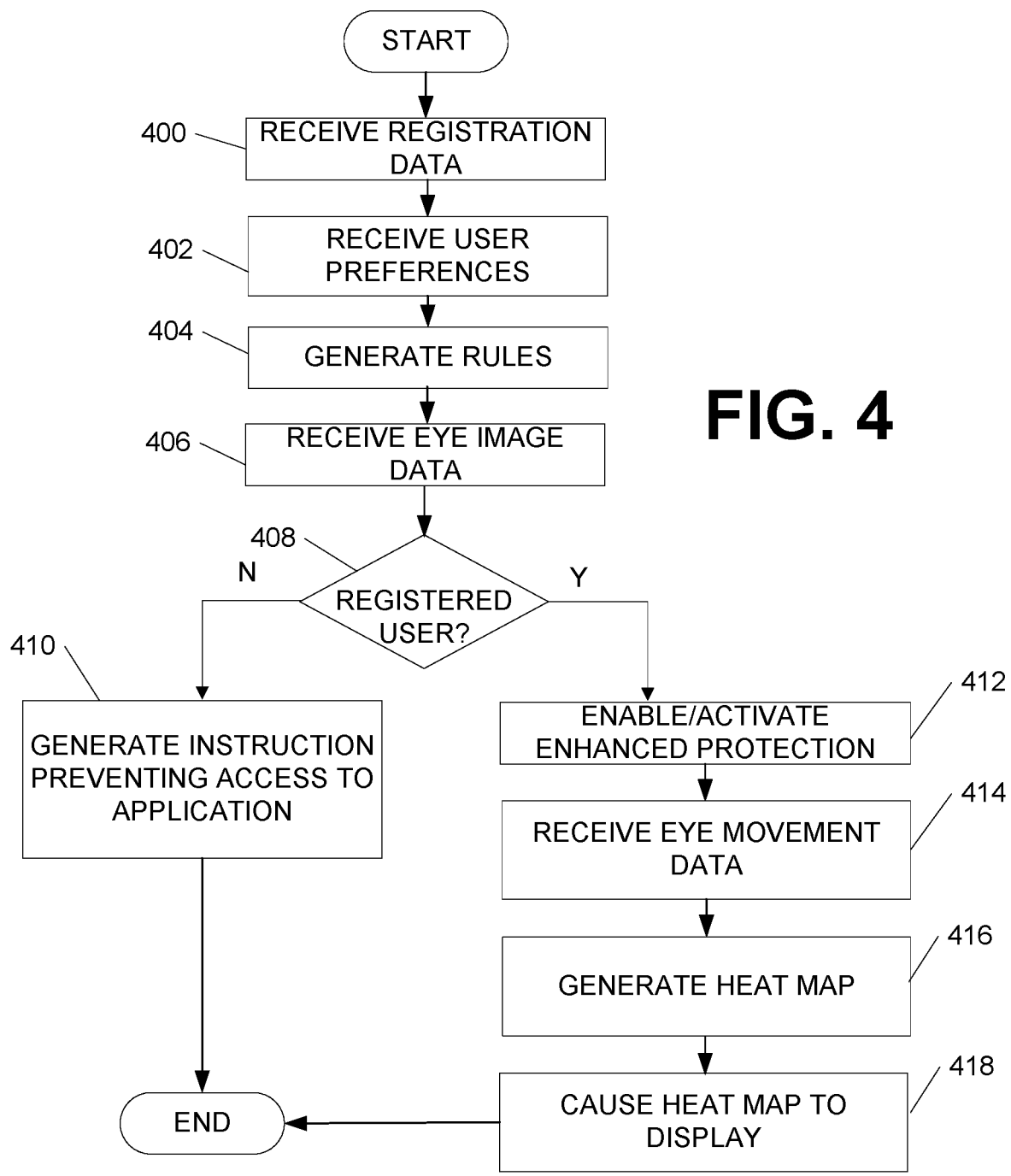
FIG. 4 depicts an illustrative method for implementing and using enhanced security or protection functions according to one or more aspects described herein.

FIG. 4 is a flow chart illustrating one example method of implementing enhanced protection functions according to one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 400, registration data may be received from a user. For instance, a user may request to register for enhanced protection and may provide registration information such as name, contact information, account information, user device information, and the like. In some arrangements, the user may capture and/or transmit eye image or other identifying data that may be used to identify or distinguish a registered user from a non-registered user. In some examples, registration data may include data associated with one or more applications on a user device, such as remote user computing device 170.

At step 402, one or more user preferences may be received. For instance, user preferences related to applications for which enhanced processing should be activated, thresholds for action, requirements for validation, and the like, may be received.

At step 404, one or more enhanced protection rules may be generated. For instance, rules related to applications for which enhanced protection will be enabled, criteria for enabling enhanced protection, thresholds for detecting a look-away, and the like may be generated and transmitted to the user device, such as remote user computing device 170, for execution by the device.

At step 406, eye image data may be received. For instance, upon executing an application for which enhanced protection is enabled or authorized, an image capture device of the remote user computing device 170 may capture an image of one or more eyes of a user interacting with the device. The image data may, in some examples, be transmitted to the enhanced protection computing platform 110 for analysis.

At step 408, a determination may be made as to whether the received eye image data matches or corresponds to pre-stored eye image data of a registered user (e.g., received via the registration data). If not, one or more instructions may be generated and/or executed that may prevent access to one or more applications on the remote user computing device at step 410.

If, at step 408, the received eye image data matches or corresponds to a registered user, enhanced protection may be enabled and/or activated at step 412. For instance, an image capture device of the remote user computing device may be activated and instructed to capture additional data.

At step 414, eye movement data may be received. For instance, eye movement data captured by the image capture device of the remote user computing device may be received. In some examples, the data may be received in real-time or near real-time. The data may include video data that captures a user's eye movement as the user interacts with an application for which enhanced protection is enabled or activated.

At step 416, the received eye movement data may be analyzed with application data to generate one or more heat maps identifying portions or regions of the application that the user viewed for an extended period of time, a short period of time, or the like. In some examples, machine learning may be used to analyze the data and generate the heat maps, generate one or more outputs including recommendations for improved user experience, and the like.

At step 418, the heat map may be transmitted to, for example, local user computing device 150 and caused to display on local user computing device 150.

Figure 5:
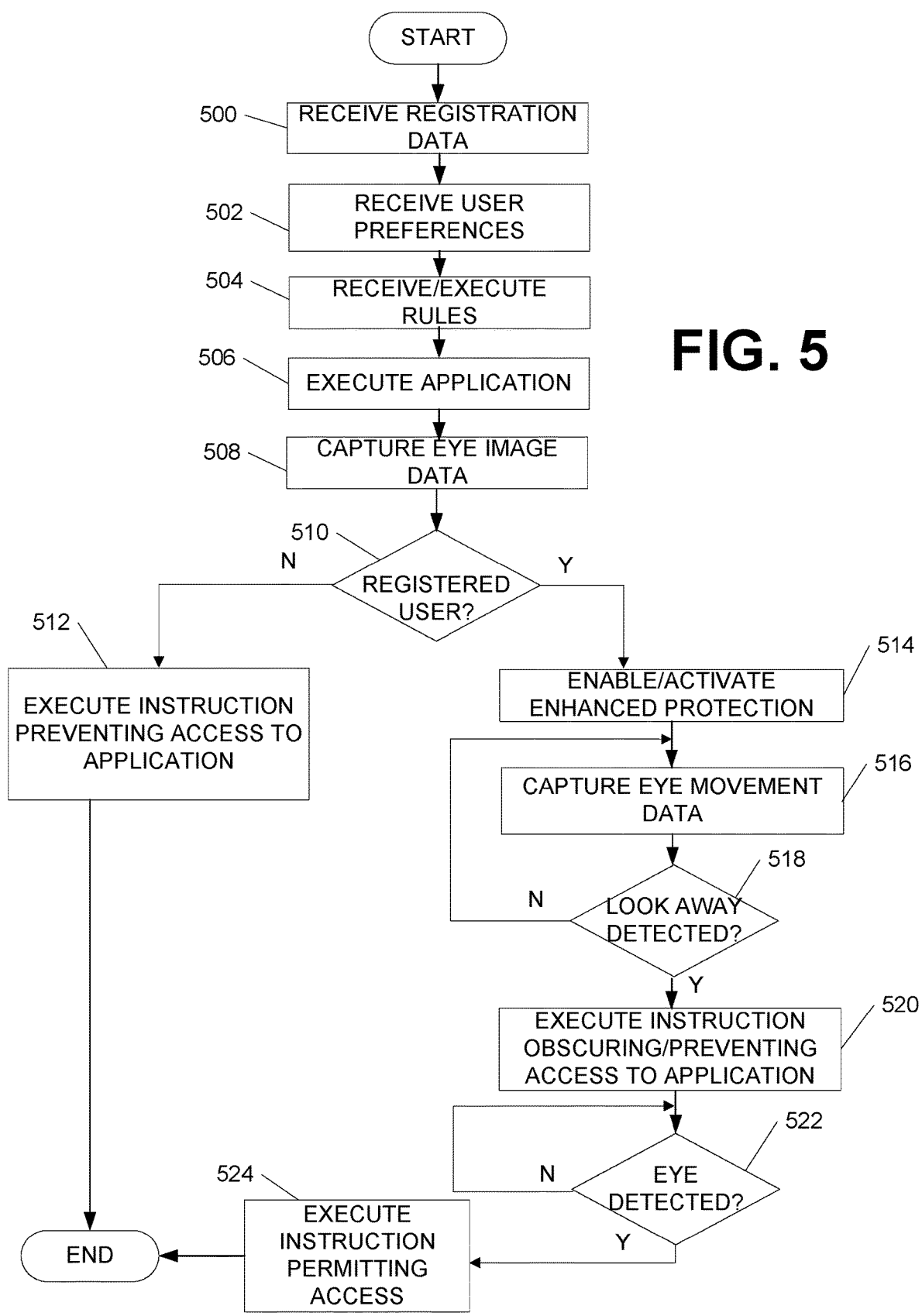
FIG. 5 illustrates another illustrative method for implementing and using enhanced security or protection functions according to one or more aspects described herein.

FIG. 5 is a flow chart illustrating another example method of implementing enhanced protection functions according to one or more aspects described herein. The processes illustrated in FIG. 5 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 500, registration data may be received from a user. For instance, a user may input into his or her user computing device (e.g., remote user computing device 170) a request to register for enhanced protection and may provide registration information such as name, contact information, account information, user device information, and the like. In some arrangements, the user may capture eye image or other identifying data that may be used to identify or distinguish a registered user from a non-registered user. In some examples, registration data may include data associated with one or more applications on a user device, such as remote user computing device 170. The data may be stored on remote user computing device 170 and/or transmitted to enhanced protection computing platform 110.

At step 502, one or more user preferences may be received. For instance, user preferences related to applications for which enhanced processing should be activated, thresholds for action, requirements for validation, and the like, may be received via user input into remote user computing device 170.

At step 504, one or more enhanced protection rules may be received from enhanced protection computing platform 110 and executed. For instance, rules related to applications for which enhanced protection will be enabled, criteria for enabling enhanced protection, thresholds for detecting a look-away, and the like may be received by remote user computing device 170 and may be executed by the device. In some examples, one or more rules may be executed upon being received by remote user computing device 170. Additionally or alternatively, one or more rules may be stored by remote user computing device 170 for execution upon detection of a triggering event (e.g., execution of a particular application).

At step 506, an application may be executed by remote user computing device 170. Executing the application may cause execution of an instruction to evaluate the application to determine whether it is flagged for enhanced protection. If so, one or more additional rules may be executed.

For instance, at step 508, an instruction may be executed to activate an image capture device of the remote user computing device 170 and capture an image of one or more eyes of a user interacting with the device 170.

At step 510, the eye image data may be compared to pre-stored data (e.g., received via registration) to determine whether the captured eye image data matches pre-stored data of a registered user. If not, at step 512, an instruction may be executed preventing access to the application (e.g., causing the application to close).

If, at step 510, the eye image data matches eye image data of a registered user, further enhanced protection functions may be activated or enabled at step 514 (e.g., one or more additional rules may be executed).

At step 516, eye movement data may be captured. For instance, the image capture device of remote user computing device 170 may capture (in some examples, continuously) eye movement data of the user as the user interacts with the application. As discussed herein, this data may be transmitted to enhanced protection computing platform 110 for further analysis. Additionally or alternatively, the eye movement data may be evaluated by remote user computing device 170 to determine whether a look-away has occurred.

At step 518, the remote user computing device 170 may monitor or analyze the eye movement data to determine whether a look-away has occurred (e.g., whether a user eye has looked away from the application for at least a predetermined period of time). If not, the process may return to step 516 and continue to capture eye movement data as the user continues to interact with the application.

If, at step 518, a look-away is detected, a rule or instruction preventing access to the application or obscuring data in the application may be executed at step 520. Accordingly, as the user's attention is no longer on the application, the system may prevent others from inadvertently viewing data in the application.

At step 522, data (e.g., captured by forward facing camera) may continue to be collected and analyzed to determine whether an eye of a user has been detected (e.g., the user has returned to looking at the application or interacting with the application). If not, the process may continue to monitor for detection of an eye.

If, at step 522, an eye is detected, the eye may be validated to confirm that it is an eye of a registered user (e.g., by capturing image data and comparing it to pre-stored data) and, at step 524, an instruction or rule permitting access to the application may be executed. For instance, the application may be launched, an overlay obscuring data on the application may be removed, or the like.

As discussed, aspects described herein are related to using eye movement tracking to aid in maintaining user data privacy and security and to understanding and improving user experience with an application. As described, eye movement data of a user as the user interacts with an application may be captured and analyzed to determine when a user has looked away from an application and prevent access to the application or data associated therewith when a look-away is detected. Additionally or alternatively, analyzing eye movement data of a user may provide detailed insights into user interaction with an application in order to improve application layout, user experience, and the like.

As discussed herein, eye movement data may be used to generate one or more heat maps that may be used to evaluate a user experience, generate recommendations for improvement, and the like. As discussed, machine learning may be used to evaluate the eye movement data and application data to understand aspects of the application that the user interacted with (e.g., for at least a predetermined time period) and those that the user did not interact with. Machine learning may be used to identify or detect patterns in the data that may be used to improve application design, identify new ways to present data to a user, and the like.

Eye movement data may provide additional detailed information over conventional systems that may capture and analyze mouse clicks, user selections from an application, or the like. Analyzing eye movement data may provide more granular insights into portions of the application that were of interest to the user, portions that were not of interest to the user, and the like.

As discussed herein, an image capture device of the user device (e.g., mobile device or the like) may be used to detect an eye of a user. In some examples, machine learning, object recognition or the like may be used to identify an object viewed or captured by the image capture device as an eye (e.g., of a user). Accordingly, the system may then capture an image or movement of the object identified (e.g., via machine learning) as the eye.

In some examples, the eye may be detected (e.g., based on machine learning) but pre-stored eye data associated with a registered user may be relied on to confirm that the eye identified is the eye of the registered user. For instance, one or more points within pre-stored eye image data may be compared to corresponding points in a captured image of an eye to confirm that the eye corresponds to the registered user. In some examples, a plurality of points may be identified and compared and if at least a threshold number of points match (e.g., at least 50%, at least 75%, and the like), the eye may be considered that of a registered user.

In some examples, a user or system may customize one or more settings associated with the arrangements described herein. For instance, for a user with a visual impairment, a user may select to have one particular eye, both eyes, or the like, used to confirm that the user is a registered user and/or to capture eye movement data. For instance, a user having an impairment that limits user control of, for example, a left eye, may select that a right eye of a user be captured to confirm that the user is a registered user and/or movement of the right eye be used to captured to evaluate user interaction with the application. In another example, a user may request to have both eyes captured to confirm the user is a registered user and/or for eye movement tracking.

In another example, a user may select options to customize aspects related to look-away detection. For instance, a user may customize threshold periods of time used to detect a look-away. In some arrangements, the threshold for detecting a look-away may be based on a user location. For instance, if a user is connected to home WiFi, the threshold for look-away may be a longer period of time than if the user is connected to public WiFi. In some examples, a user may turn on or off enhanced protections. For instance, if a user may turn on enhanced protection when in public or in particular locations and may turn off enhanced protection when in a private location. Various other customization options may be selected by the user or the system without departing from the invention.

Although aspects described herein are described in the context of capturing an image of the eye and comparing that to pre-stored eye image data, in some examples, the captured image data and pre-stored image data may also include video data. Accordingly, in addition to comparing features of the eye, in some examples, patterns of movement of the eye may be used to verify or confirm that the user is a registered user. For instance, machine learning may be used to evaluate captured image data to compare to historical image data (e.g., movement data) of the eye of the registered user to confirm or verify that the user is a registered user.

As discussed herein, enhanced protection may be applied to all applications executing on a user device or may be applied to a portion of applications. For instance, the system may identify a type of application or category of application associated with each application on a user device. Applications having a particular type or category may have enhanced protection applied. For instance, applications may be identified as high risk, low risk, medium risk, or the like. In some examples, applications facilitating transactions, such as a mobile banking application, may be considered high risk (e.g., it would be desirable to have enhanced protections) and may be categorized as such. Accordingly, when an application is executed, if the application has been flagged for enhanced protection or enhanced protection has been applied to that application (e.g., based on the type or category of the application) the enhanced protection rules or instructions may be executed (e.g., image capture device activated, eye movement captured, and the like). In some examples, evaluating an application to determine whether enhanced protection applies may be performed by the user device or by, for example, enhanced protection computing platform 110.

Although aspects discussed herein are related to preventing access to data based on a user looking away from the application, in some examples, detection of an eye of a non-registered user may also cause the system to modify access to the application (e.g., close the application, obscure data, or the like).

In some arrangements, an override associated with a look-away or non-registered eye detection may be provided. For instance, in some arrangements, if a look-away is detected or if a non-registered eye is detected, the system may generate and display a user interface indicating that access to the application is about to modified based on a detected look-away or non-registered eye. The user may then elect to proceed with modifying access to the application or may select to continue without modifying access. In some examples, the system may cause the display to flicker or otherwise draw the attention of the user.

In some examples, if multiple camera views are available, the system may activate a wide angle view in order to capture a greater field of detection.

In some arrangements, the user may disable features of mobile devices having an indicator of a scan for a face or eye. For instance, when an application having enhanced protection executes, the user may disable indicators of scanning or the system may automatically disable that feature. Once the user has stopped using the application having enhanced protection, features indicating scanning or camera on indicators may be automatically enabled.

In some examples, machine learning may be used to predict a look-away of a user. For instance, some standard functions may have expected look-aways. In one example, if a user is using his or her mobile device to deposit a check, a look-away may be expected when the user aligns the camera with the check, flips the check to capture the image of the rear of the check, and the like. Machine learning may be used to anticipate those look-aways and modified criteria for look-away detection when conducting one of those functions.

Figure 6:
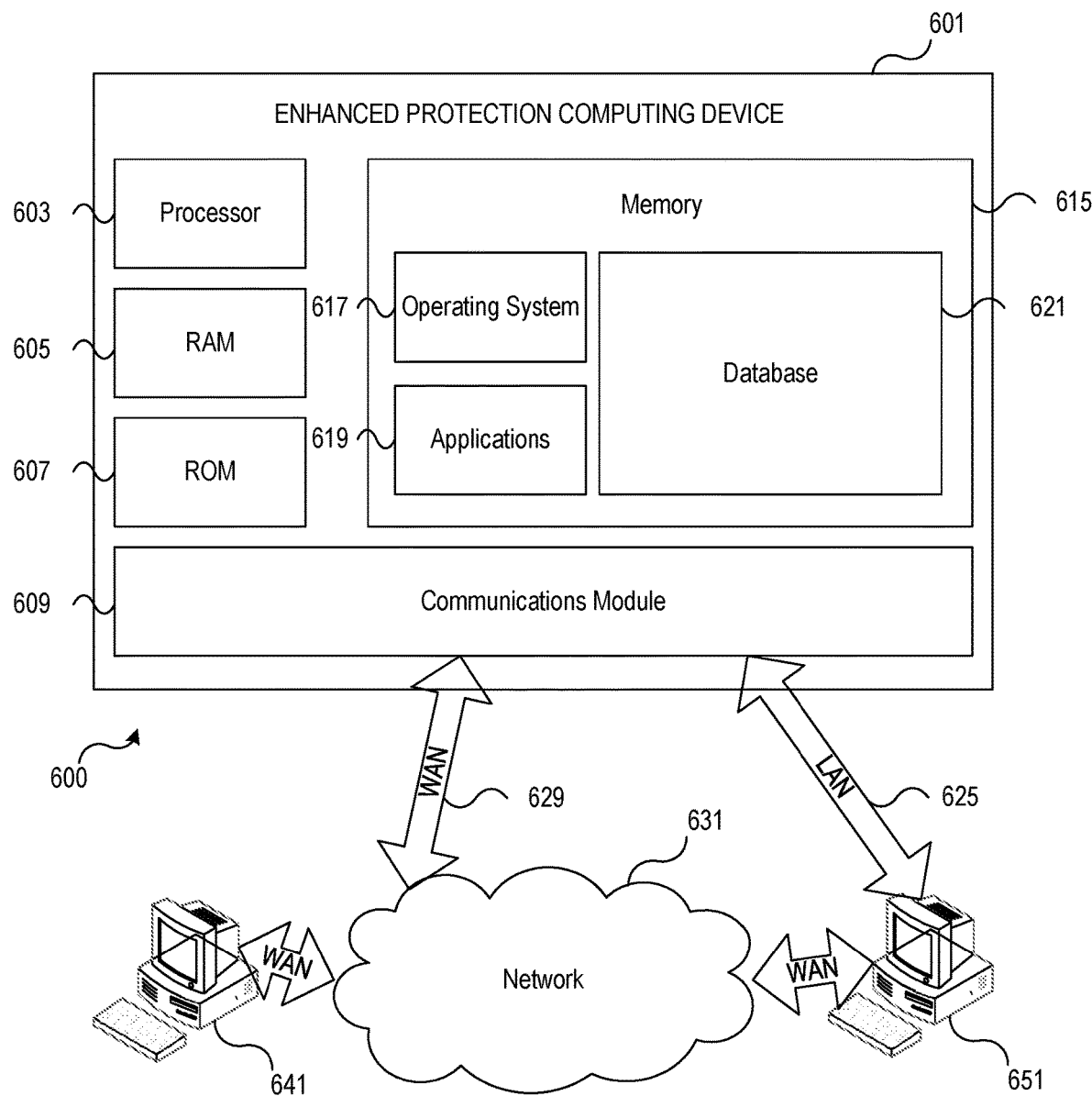
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include enhanced protection computing device 601 having processor 603 for controlling overall operation of enhanced protection computing device 601 and its associated components, including Random Access Memory (RAM) 605, Read-Only Memory (ROM) 607, communications module 609, and memory 615. Enhanced protection computing device 601 may include a variety of computer readable media. Computer readable media may be any available media that may be accessed by enhanced protection computing device 601, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by enhanced protection computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on enhanced protection computing device 601. Such a processor may execute computer-executable instructions stored on a computer-readable medium.

Software may be stored within memory 615 and/or storage to provide instructions to processor 603 for enabling enhanced protection computing device 601 to perform various functions as discussed herein. For example, memory 615 may store software used by enhanced protection computing device 601, such as operating system 617, application programs 619, and associated database 621. Also, some or all of the computer executable instructions for enhanced protection computing device 601 may be embodied in hardware or firmware. Although not shown, RAM 605 may include one or more applications representing the application data stored in RAM 605 while enhanced protection computing device 601 is on and corresponding software applications (e.g., software tasks) are running on enhanced protection computing device 601.

Communications module 609 may include a microphone, keypad, touch screen, and/or stylus through which a user of enhanced protection computing device 601 may provide input, and may also include one or more of a speaker for providing audio output and a video display device for providing textual, audiovisual and/or graphical output. Computing system environment 600 may also include optical scanners (not shown).

Enhanced protection computing device 601 may operate in a networked environment supporting connections to one or more remote computing devices, such as computing devices 641 and 651. Computing devices 641 and 651 may be personal computing devices or servers that include any or all of the elements described above relative to enhanced protection computing device 601.

The network connections depicted in FIG. 6 may include Local Area Network (LAN) 625 and Wide Area Network (WAN) 629, as well as other networks. When used in a LAN networking environment, enhanced protection computing device 601 may be connected to LAN 625 through a network interface or adapter in communications module 609. When used in a WAN networking environment, enhanced protection computing device 601 may include a modem in communications module 609 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
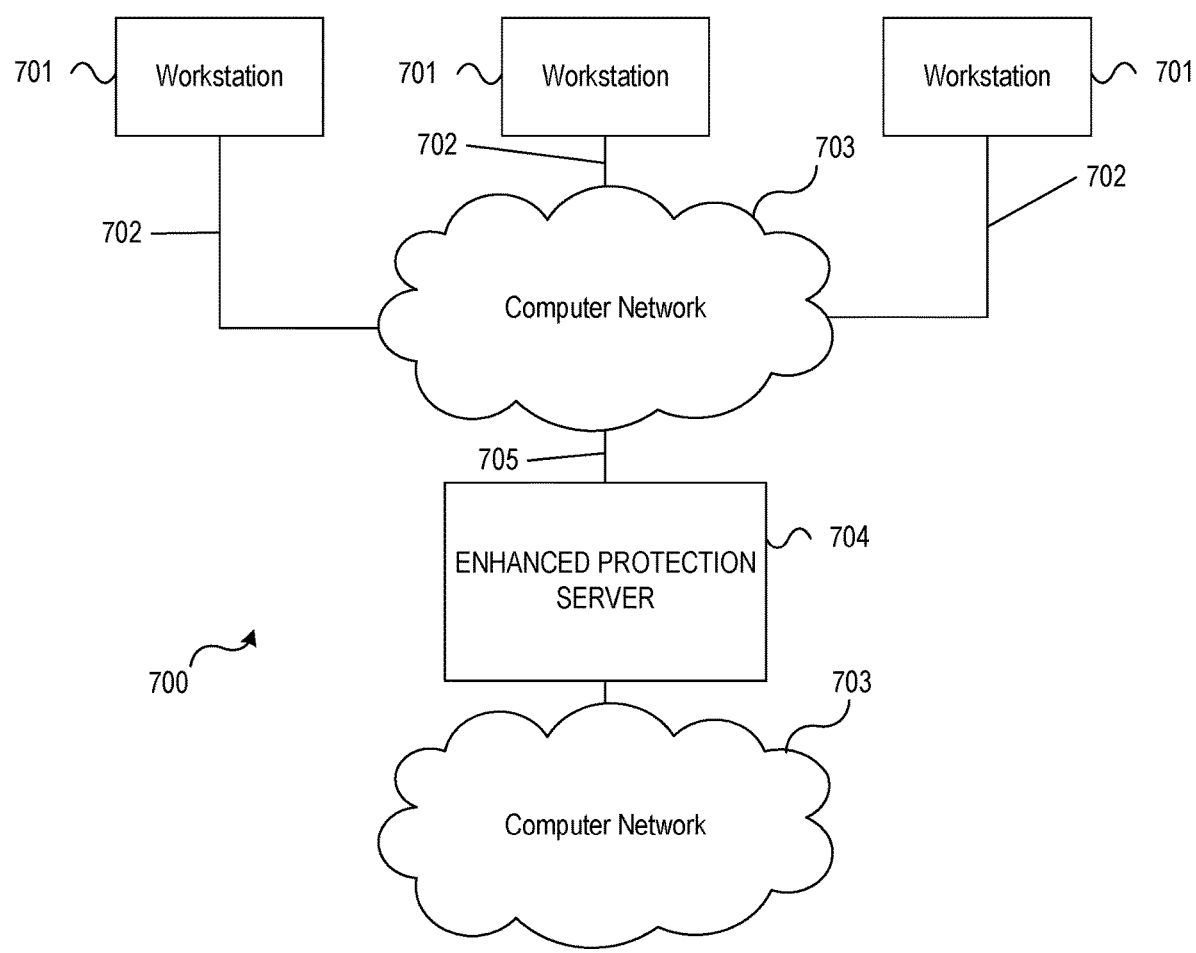
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to enhanced protection server 704. In system 700, enhanced protection server 704 may be a server, processor, computer, or data processing device, or combination of the same, configured to perform the functions and/or processes described herein. Server 704 may be used to receive registration data, generate enhanced protection rules, receive and analyze eye image data and/or eye movement data, generate heat maps, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and enhanced protection server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing device, comprising:
   at least one processor;
   a communication interface communicatively coupled to the at least one processor; and
   a memory storing computer-readable instructions that, when executed by the at least one processor, cause the computing device to:
      receive a plurality of executable instructions associated with enhanced protection;
      execute an application;
      analyze the application to determine that enhanced protection applies;
      execute one or more executable instructions of the plurality of executable instructions associated with enhanced processing, executing the one or more executable instructions including:
         activate an image capture device of the computing device;
         capture, via the image capture device of the computing device, an image of an eye of a user interacting with the application;
         compare the captured image of an eye to pre-stored eye image data;
         response to determining, based on the comparing, that the captured image of the eye does not match pre-stored eye image data, preventing access to the application;
         responsive to determining, based on the comparing, that the captured image of the eye does match pre-stored eye image data:
            capture eye movement data as the user interacts with the application;
            analyze the captured eye movement data to detect a look-away of a user; and
            responsive to detecting a look-away of a user, execute an instruction preventing access to data in the application.

2. The computing device of claim 1, wherein preventing access to data in the application includes causing the application to close.

3. The computing device of claim 1, wherein preventing access to data in the application includes displaying an overlay on a display of the computing device obscuring the data in the application.

4. The computing device of claim 1, wherein detecting a look-away includes detecting that the eye of the user interacting with the application is not looking at the application for at least a predetermined time period.

5. The computing device of claim 1, further including instructions that, when executed, cause the computing device to:
   after detecting a look-away, continue analyzing captured eye movement data to detect the eye of the user is again interacting with the application; and
   responsive to detecting the eye of the user is again interacting with the application, providing access to the data in the application.

6. The computing device of claim 5, wherein providing access to the data in the application includes re-executing the application.

7. The computing device of claim 5, wherein providing access to the data in the application includes removing an overlay on a display of the computing device obscuring data in the application.

8. A computing platform, comprising:
   at least one processor;
   a communication interface communicatively coupled to the at least one processor; and
   a memory storing computer-readable instructions that, when executed by the at least one processor, cause the computing platform to:
      receive a request for registration, the request for registration including registration data including an image of an eye of a registered user;
      store the received registration data;
      generate, based at least in part on the registration data, a plurality of executable instructions associated with enhanced protection;
      transmit the plurality of executable instructions to a user computing device;
      receive, from the user computing device, eye image data;
      compare the received eye image data to the stored image of the eye of the registered user;
      responsive to determining that the received eye image data does not match the stored image of the eye of the registered user, transmit an instruction to the user computing device preventing access to an application having enhanced protection;
      responsive to determining that the received eye image data does match the stored image of the eye of the registered user, identify the received eye image data as the eye of the registered user and:
         receive, from the user computing device, eye movement data associated with the eye of the registered user interacting with an application on the user computing device;
         analyze the received eye movement data to identify a first portion of the application that the user viewed for greater than a first threshold time period and a second portion of the application that the user viewed for less than a second threshold time period; and generate, based on the analyzed eye movement data, a heat map indicating user interaction with the application.

9. The computing platform of claim 8, wherein the registration data further includes data associated with a plurality of applications on the user computing device.

10. The computing platform of claim 9, wherein generating the plurality of executable instructions includes identifying one or more applications of the plurality of applications for enhanced protection.

11. The computing platform of claim 10, wherein identifying the one or more applications for enhanced protection is based on a type or category of each application.

12. The computing platform of claim 8, further including instructions that, when executed, cause the computing platform to:

receive user preference data including user preferences associated with enhanced protection; and wherein generating the plurality of executable instructions is further based on the received user preference data.

13. The computing platform of claim 8, wherein the eye movement data is received in real-time.

14. The computing platform of claim 8, further including instructions that, when executed, cause the computing platform to:

generate, based on the analyzed eye movement data and one or more machine learning datasets, one or more recommendations for improvements to the application.

15. A method, comprising:

receiving, by a computing device having at least one processor and a memory, a plurality of executable instructions associated with enhanced protection;

executing, by the at least one processor, an application;

analyzing, by the at least one processor, the application to determine that enhanced protection applies;

executing, by the at least one processor, one or more executable instructions of the plurality of executable instructions associated with enhanced processing, executing the one or more executable instructions including:

activating, by the at least one processor, an image capture device of the computing device;

capturing, by the at least one processor and via the image capture device of the computing device, an image of an eye of a user interacting with the application;

comparing, by the at least one processor, the captured image of an eye to pre-stored eye image data;

response to determining, based on the comparing, that the captured image of the eye does not match pre-stored eye image data, preventing, by the at least one processor, access to the application;

responsive to determining, based on the comparing, that the captured image of the eye does match pre-stored eye image data:

capturing, by the at least one processor and via the image capture device, eye movement data as the user interacts with the application;

analyzing, by the at least one processor, the captured eye movement data to detect a look-away of a user; and responsive to detecting a look-away of a user, executing, by the at least one processor, an instruction preventing access to data in the application.

16. The method of claim 15, wherein preventing access to data in the application includes causing the application to close.

17. The method of claim 15, wherein preventing access to data in the application includes displaying an overlay on a display of the computing device obscuring the data in the application.

18. The method of claim 15, wherein detecting a look-away includes detecting that the eye of the user interacting with the application is not looking at the application for at least a predetermined time period.

19. The method of claim 15, further including instructions that, when executed, cause the computing device to:

after detecting a look-away, continue analyzing captured eye movement data to detect the eye of the user is again interacting with the application; and responsive to detecting the eye of the user is again interacting with the application, providing access to the data in the application.

20. The method of claim 19, wherein providing access to the data in the application includes re-executing the application.

21. The method of claim 19, wherein providing access to the data in the application includes removing an overlay on a display of the computing device obscuring data in the application.

* * * * *